United States Patent
Hama et al.

(10) Patent No.: US 7,841,256 B2
(45) Date of Patent: Nov. 30, 2010

(54) ARTICULATED MANIPULATOR

(75) Inventors: Yasuhiro Hama, Kakogawa (JP); Yoshiaki Tanaka, Akashi (JP); Takahiro Inada, Kakogawa (JP)

(73) Assignees: Toyota Jidosha Kabushiki Kaisha, Toyota (JP); Kawasaki Jukogyo Kabushiki Kaisha, Kobe (JP)

( * ) Notice: Subject to any disclaimer, the term of this patent is extended or adjusted under 35 U.S.C. 154(b) by 905 days.

(21) Appl. No.: 10/544,080

(22) PCT Filed: Feb. 5, 2004

(86) PCT No.: PCT/JP2004/001177

§ 371 (c)(1),
(2), (4) Date: Aug. 1, 2005

(87) PCT Pub. No.: WO2004/069493

PCT Pub. Date: Aug. 19, 2004

(65) Prior Publication Data

US 2006/0179964 A1 Aug. 17, 2006

(30) Foreign Application Priority Data

Feb. 7, 2003 (JP) .............................. 2003-031656

(51) Int. Cl.
*B25J 17/00* (2006.01)
*B25J 17/02* (2006.01)
*B25J 18/00* (2006.01)

(52) U.S. Cl. .................. 74/490.05; 74/490.06; 901/23; 901/25

(58) Field of Classification Search .............. 74/490.01, 74/490.03, 490.05, 490.06; 901/15, 23, 25
See application file for complete search history.

(56) References Cited

U.S. PATENT DOCUMENTS

| | | | | |
|---|---|---|---|---|
| 4,831,893 A | * | 5/1989 | Obama et al. | ............ 74/490.05 |
| 4,973,215 A | | 11/1990 | Karlen et al. | |
| 5,293,107 A | | 3/1994 | Akeel | |
| 5,697,754 A | * | 12/1997 | Raymer | ...................... 414/537 |
| 5,816,108 A | * | 10/1998 | Obata et al. | .............. 74/490.05 |

(Continued)

FOREIGN PATENT DOCUMENTS

DE        42 42 575 A1      6/1993

(Continued)

OTHER PUBLICATIONS

H. Matsuura et al.; "Measuring/Grinding System for Water Turbine Runner"; Proceedings of the 15$^{th}$ International Symposium on Industrial Robots; 11, 12 and 13 Sep. 1985; pp. 199-206.

*Primary Examiner*—Thomas R Hannon
*Assistant Examiner*—Justin Krause
(74) *Attorney, Agent, or Firm*—Oliff & Berridge, PLC

(57) ABSTRACT

A miniaturized articulated manipulator 20 has a first arm member 31A internally provided with two driving motors 33 and 34, and a second arm member 30B not provided with any devices corresponding to the driving motors 33 and 34 and capable of being miniaturized. The driving motors 33 and 34 can be disposed in common areas 135 at least partially overlapping each other with respect to a direction parallel to the axis of the first arm member 30A and can be arranged in a direction perpendicular to the axis. Thus the first arm member 30A can be formed in a small axial size. Thus the first arm 30A and the second arm 30B can be miniaturized and hence the articulated manipulator 20 can be formed in a short overall length.

8 Claims, 13 Drawing Sheets

U.S. PATENT DOCUMENTS

| | | | |
|---|---|---|---|
| 5,860,327 A * | 1/1999 | Stanev | 74/490.05 |
| 6,408,224 B1 * | 6/2002 | Okamoto et al. | 700/245 |
| 2003/0010148 A1 * | 1/2003 | Okamoto et al. | 74/490.05 |
| 2004/0149064 A1 * | 8/2004 | Narita et al. | 74/490.03 |

FOREIGN PATENT DOCUMENTS

| | | |
|---|---|---|
| EP | 0 153 884 A1 | 9/1985 |
| FR | 2 753 925 A1 | 4/1998 |
| JP | A 56-163624 | 12/1981 |
| JP | A 62-148182 | 7/1987 |
| JP | U 04-115592 | 10/1992 |
| JP | A 06-315879 | 11/1994 |
| JP | A 10-225881 | 8/1998 |
| JP | A 11-198088 | 7/1999 |
| JP | A 2001-138279 | 5/2001 |
| JP | A 2003-025269 | 1/2003 |
| WO | WO 88/03856 | 6/1988 |
| WO | WO 98/26906 | 6/1998 |

* cited by examiner

ARTICULATED MANIPULATOR

TECHNICAL FIELD

The present invention relates to an articulated manipulator including a plurality of arm members and joints each connecting the adjacent arm members for turning thereon. More particularly, the present invention relates to an articulated manipulator provided with joints including coaxial joints each connecting two adjacent arm members for turning about a common axis, and angular joints each connecting two adjacent arm members so that one of the two arm members is able to precess relative to the other arm member.

BACKGROUND ART

A prior art articulated manipulator proposed in Patent document 1 has an angular joint connecting two arm members. The angular joint connects two arm members such that one of the two arm members is able to precess relative to the other arm member. The arm member which precesses turns about an axis of rotation inclined at a predetermined angle to the axis of the arm member. The articulated manipulator provided with the angular joint moves an object held on its free end to a desired position.

Another prior art articulated manipulator proposed in Patent document 2 or 3 is provided with arm members successively connected in a linear arrangement and forming a hollow space extending therethrough. Power cables and signal cables are extended in the hollow space to form power transmission lines for transmitting power for driving the arm members for rotation and signal transmission lines in the articulated manipulator.

Patent document 1: JP 62-148182 A
Patent document 2: JP 10-225881 A
Patent document 3: JP 2001-138279 A The articulated manipulator disclosed in Patent document 2 has a hollow space for holding wires therein. The articulated manipulator is provided with a coreless direct electric motor, namely, the so-called hollow direct motor, to form the hollow space. Linear members, such as power lines and signal lines, are passed through the hollow direct motor and are extended along the respectively axes of the arm members.

The hollow direct motor has a stator fastened to one of two arm members, and a rotor fastened to the other arm member. The hollow direct motor is a motor having a special shape, namely, an annular shape. Therefore, the manufacturing cost of the articulated manipulator provided with the hollow direct motor is high. This articulated manipulator has problems; hollow direct motor has a small power capacity for its size, an encoder cannot be disposed on the axis of rotation, and accurate positioning cannot be achieved.

The articulated manipulator disclosed in Patent document 3 has arm members individually provided with built-in motors, respectively. Since each arm member is provided with the built-in motor, the arm member cannot be miniaturized in a size smaller than that of the built-in motor and, consequently, the articulated manipulator cannot be sufficiently miniaturized. The driving force of the motor is transmitted by an internal bevel gear or a belt.

The internal bevel gear is formed by complicated machining. Since an input shaft in the center of the motor and the output shaft of a reduction gear do not intersect perpendicularly each other, support members need accurate machining and accurate assembling. Since hollows in the bevel gear and the reduction gear are not sealed, lubricant, such as grease or oil, leaks. The motor disposed inside the bevel gear affects adversely to the efficiency of utilization of the hollow.

When the belt is employed, a tension adjusting mechanism is needed, the arm member must be designed so as to hold the belt and, consequently, the construction of the arm member is inevitably complicated.

DISCLOSURE OF THE INVENTION

Accordingly, it is an object of the present invention to provide an articulated manipulator not employing any special motors, having a simple mechanism, and capable of being formed in a small size.

The present invention provides an articulated manipulator including: a plurality of arm members successively connected in a linear arrangement; joints each connecting the two adjacent arm members so that the two arm members are able to turn relative to each other; and a plurality of driving means each for driving the two adjacent arm members for turning relative to each other; wherein at least one of the arm members has opposite ends connected to the two other arm members by the joints, respectively, the arm member having the opposite ends connected to the two other arm members is provided with the two driving means for driving the two other arm members connected thereto for turning, and the two driving means built into the arm member having the opposite ends connected to the two other arm members are disposed in areas at least partially overlapping each other with respect to a direction along the axis of the middle arm member.

According to the present invention, at least one of the two arm members connected to the arm member provided with the driving means does not need to be provided with any driving means because the middle arm member is provided with the two built-in driving means. Thus the other arm member can be formed in a small size regardless of the shape of the driving means. Since the two driving means are disposed partially in the common area with respect to the direction along the axis of the arm member, the two driving means can be arranged in a direction perpendicular to the axis of the arm member. Thus the two driving means built into the arm member can be prevented from coming into contact with each other even if the arm member is formed in a small axial size, and hence the arm member can be formed in a small axial size. The arm member provided with the driving means, and the two arm members respectively connected to the opposite ends of the arm member provided with the driving means can be miniaturized and the articulated manipulator can be formed in a comparatively short overall length.

The present invention provides an articulated manipulator including; a plurality of arm members successively connected in a linear arrangement; joints each connecting the two adjacent arm members; and a plurality of driving means each for driving the two adjacent arm members for turning relative to each other; wherein at least one of the driving means is built into the one arm member to be driven by the driving means for turning among the arm members, includes a driver which generates driving force for turning the arm member and a brake for braking the turning arm member, and the driver and the brake are disposed in areas at least partially overlapping each other with respect to a direction parallel to the axis of the arm member.

According to the present invention, the driver and the brake are disposed in areas at least partially overlapping each other with respect to the direction along the axis of the arm member, and the driver and the brake are arranged in a direction perpendicular t the axis of the arm member. Therefore, the arm member can be formed in an axial size smaller than that in which the arm member needs to be formed when the driver and the brake are arranged in a direction along the axis of the arm member. When the arm member is installed in a tilted position, a size along a direction perpendicular to the axis can be reduced. Consequently, the articulated manipulator can be formed in a short length along a direction of linear arrangement and a small thickness.

The articulated manipulator according to the present invention further includes a reduction gear for reducing the input operating speed of the driver combined with the arm member to a lower output operating speed in transmitting the rotative driving force of the driver to the adjacent arm member, and a transmission mechanism including a gear train having a plurality of spur gears respectively having axes parallel to those of the two arm member connected by the joint and capable of transmitting the rotative driving force of the driver to the reduction gear.

According to the present invention, the driving means combined with the arm member applies rotative driving force through the reduction gear to the arm member connected to the former arm member to turn the two arm members relative to each other. Application of the rotative driving force through the reduction gear enables a small driving means to exert a high torque. The use of a small driving means in combination with the arm member enables the further dimensional reduction of the arm member. Fine control of the angular positions of the two arm member relative to each other can be achieved and positioning accuracy can be improved by transmitting the driving force through the reduction gear.

Driving force can be transmitted by the reduction gear of simple construction including the spur gears. Thus the construction of the arm member provided with the built-in driving means can be simplified and the arm member can be formed in a small size. Moreover, designing and assembling the articulated manipulator and machining component parts of the articulated manipulator can be facilitated, and the reliability of the articulated manipulator can be improved. When the spur gear on the side of the reduction gear is disposed at a predetermined position, the spur gear, on the side of the driving means, engaged with the spur gear on the side of the reduction gear can be disposed at an optional position. Thus the position of the driving means in the arm member can be optionally determined.

In the articulated manipulator according to the present invention, linear members are passed through the arm members, linear members are extended through spaces in which the reduction gear and the transmission mechanism are installed, and a tubular linear member protecting member is extended between the two adjacent arm members.

In the articulated manipulator according to the present invention, the linear members are extended through the linear member protecting members.

According to the present invention, the linear members are extended in the arm members and any linear members are not extended on the outer surfaces of the arm members. Thus parts protruding from the outer surfaces of the arm members can be reduced and the linear members are prevented from coming into contact with obstacles. The linear members are, for example, electric wiring lines extending from the arm member adjacent to a base member toward the arm member at the working end of the articulated manipulator.

The tubular linear member protecting member is extended through the spaces in which the reduction gear and the transmission mechanism are installed, and the linear members are passed through the linear member protecting members. Thus the linear members can be prevented from coming into contact with the reduction gear and the transmission mechanism during operation and from being damaged.

In the articulated manipulator according to the present invention, the internal space of the linear member protecting member is hermetically separated from the spaces in which the reduction gear and the transmission mechanism are installed.

According to the present invention, the linear members are prevented from being wetted with liquids leaked from the reduction gear and the transmission mechanism. For example, even if the reduction gear and the transmission mechanism are lubricated with a lubricant, such as grease or oil, the lubricant leaked from the reduction gear and the transmission mechanism is unable to flow into spaces where the linear members are laid. Consequently, it is possible to prevent damaging the reduction gear and the transmission mechanism due to insufficient lubrication and to prevent the contamination of the areas where the linear members are laid.

In the articulated manipulator according to the present invention, at least one of the joints is an angular joint connecting the two arm members such that one of the two arm members is able to precess about an axis inclined to the respective axes of the two arm members relative to the other arm member, and the driving means is built into the arm member, on the side of the working end of the articulated manipulator, of the two arm members connected by the angular joint.

According to the present invention, the arm member, on the side of the working end of the articulated manipulator, provided with the driving means turns relative to the arm member, on the side of the base, not provided with driving means. Thus the arm member with the built-in driving means is a driven member and the arm member not provided with any driving means is a driving member.

The arm member as a driven member precesses about the axis of the angular joint relative to the arm member as the driving member. The axial length of the arm member with the built-in driving means is longer than that of the arm member not provided with any driving means. Therefore, the radius of a circle along which the arm member with the built-in driving means presses as a driven member is greater than that of a circle along which the arm member not provided with any driving means precesses as a driven member. Thus the articulated manipulator can operate in an expanded moving range. Therefore, even if the overall length of the articulated manipulator is fixed, the moving range of the articulated manipulator can be expanded.

The present invention provides an articulated manipulator including: a plurality of arm members successively connected in a linear arrangement; joints each connecting the two adjacent arm members so that the two arm members are able to turn relative to each other; and driving means each for driving the two adjacent arm members for turning relative to each other; wherein at least one of the joints is an angular joint connecting the two adjacent arm members so that the two arm members are able to turn about an axis of rotation inclined to the respective axes of the two arm members, and a driving means is built into the arm member, on the side of the free end of the articulated manipulator, of the two arm members connected by the angular joint.

According to the present invention, the arm member with the driving means on the side of the working end of the articulated manipulator turns relative to the arm member not provided with any driving means on the side of a base part; that is the arm member with the driving means is a driven member, and the arm member not provided with any driving means is a driving member.

The arm member as a driven member is driven for precession about the axis of the angular joint relative to the arm member as a driving member. The arm member with the driving means has an axial length longer than that of the arm member not provided with any driving means. Therefore, the radius of a circle along which the arm member with the built-in driving means precesses as a driven member is greater than that of a circle along which the arm member not provided with any driving means precesses as a driven member. Thus the articulated manipulator can operate in an expanded moving range. Therefore, even if the overall length of the articulated manipulator is fixed, the moving range of the articulated manipulator can be expanded.

BEST MODE FOR CARRYING OUT THE INVENTION

Figure 1:
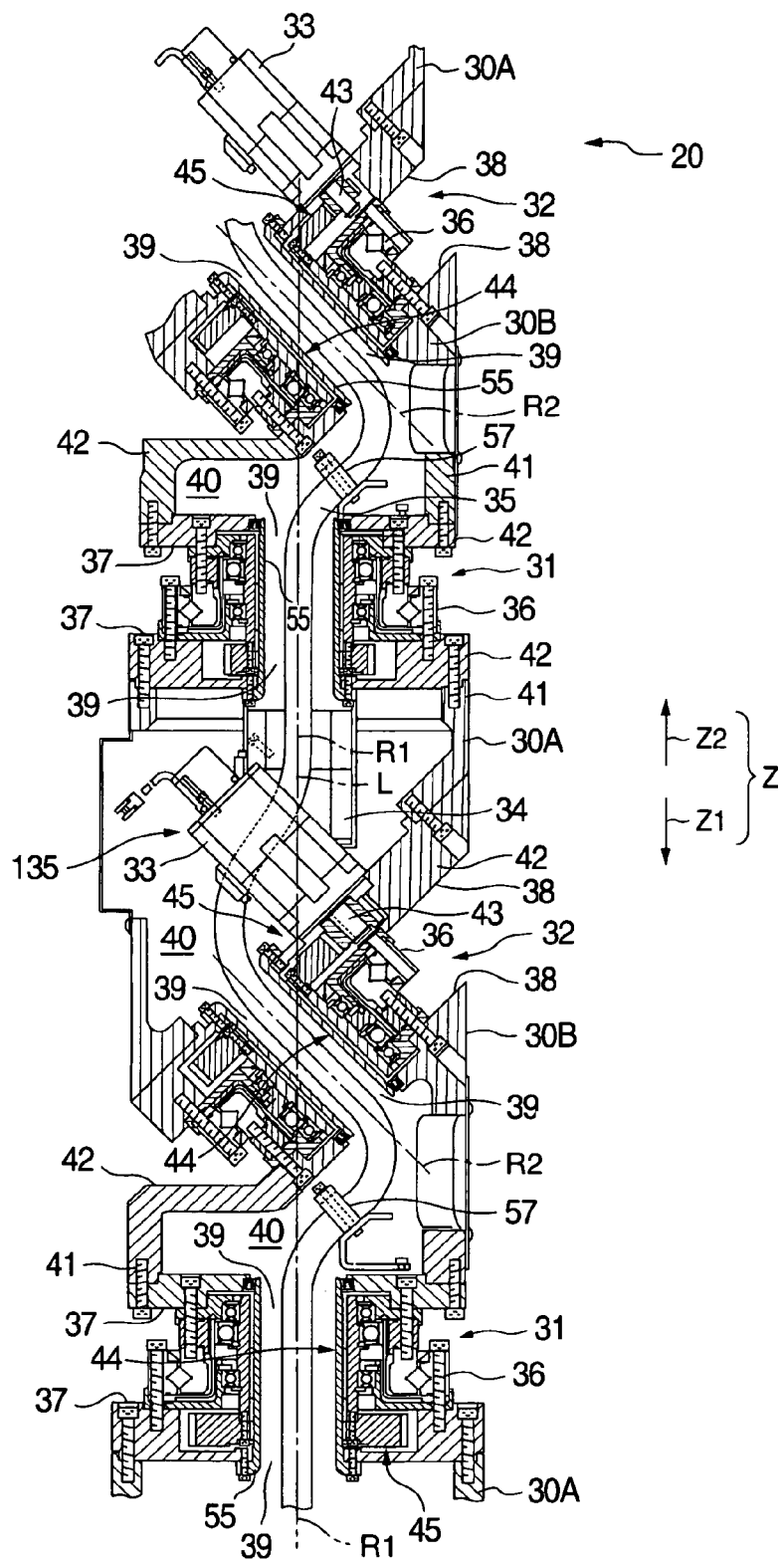
FIG. 1 is a fragmentary sectional view of an articulated manipulator 20 in a first embodiment according to the present invention.

FIG. 1 is a fragmentary sectional view of an articulated manipulator 20 in a first embodiment according to the present invention. The articulated manipulator 20 has a plurality of arms 30 and a plurality of joints 31 and 32 connecting the arm members 30 for turning relative to each other. The arms 30 are connected successively in a linear arrangement by the joints 31 and 32.

The joints 31 are coaxial joints, while the joints 32 are angular joints. The coaxial joint 31 connects the two adjacent arm members 30 so that the adjacent arm members 30 turn about an axis R1 for coaxial turning aligned with the respective axes L1 of the two adjacent arm members 30. The angular joint 31 connects the two adjacent arm members 30 so that one of the two adjacent arm members 30 precesses about an axis R2 of precession inclined to the respective axes of the two adjacent arm members 30 relative to the other arm member 30.

In the description of the present invention, the term "precession" signifies the turn of one of the two adjacent arm members 30 about the axis R2 of precession along an imaginary conical surface having its point at the joint of the two adjacent arm members. In the description of the present invention, the term "turn" also signifies angular displacement about an axis of rotation.

The articulated manipulator 20 including the coaxial joints 31 and the angular joints 32 turns the plurality of arms 30 relative to each other to perform meandering motions resembling motions of snakes for three-dimensional positioning. For example, when equipment is installed in a complicated arrangement and a complicated working passages are available or when the articulated manipulator 20 needs to work in a low posture in a narrow space between the floor and the low ceiling, the articulated manipulator 20 is able to place an object held at the extremity thereof at a desired position in a desired position.

Figure 2:
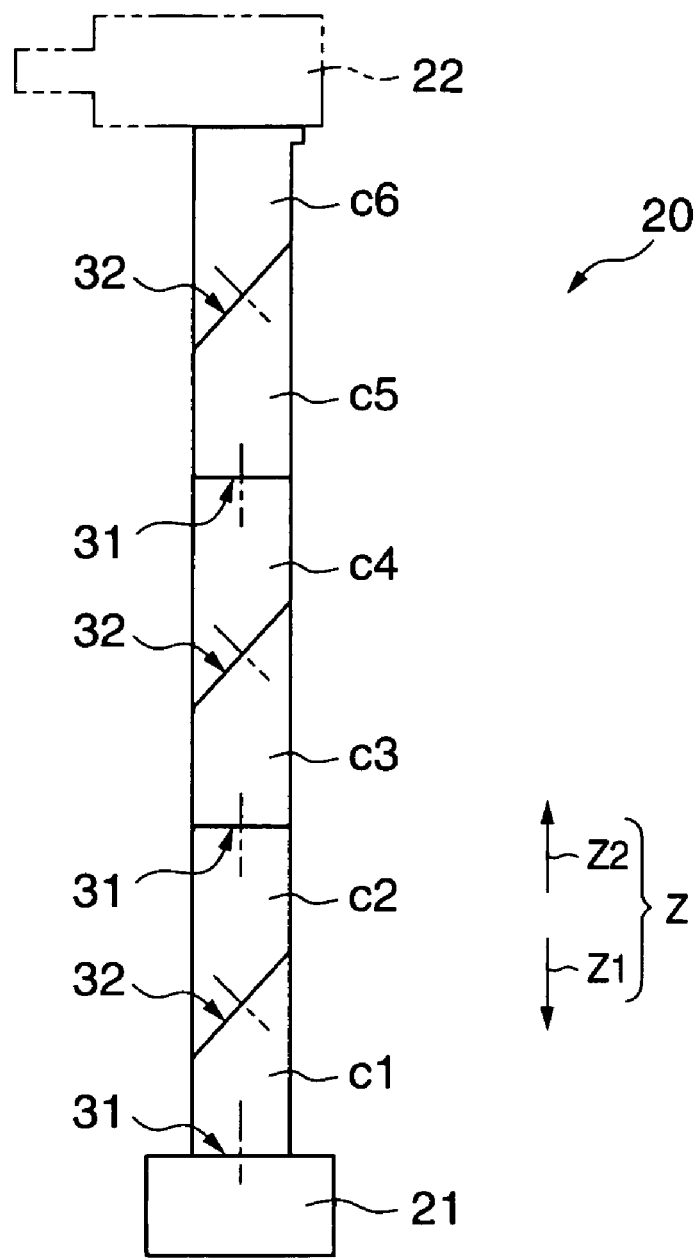
FIG. 2 is a typical side elevation of the articulated manipulator 20.
Figure 3:
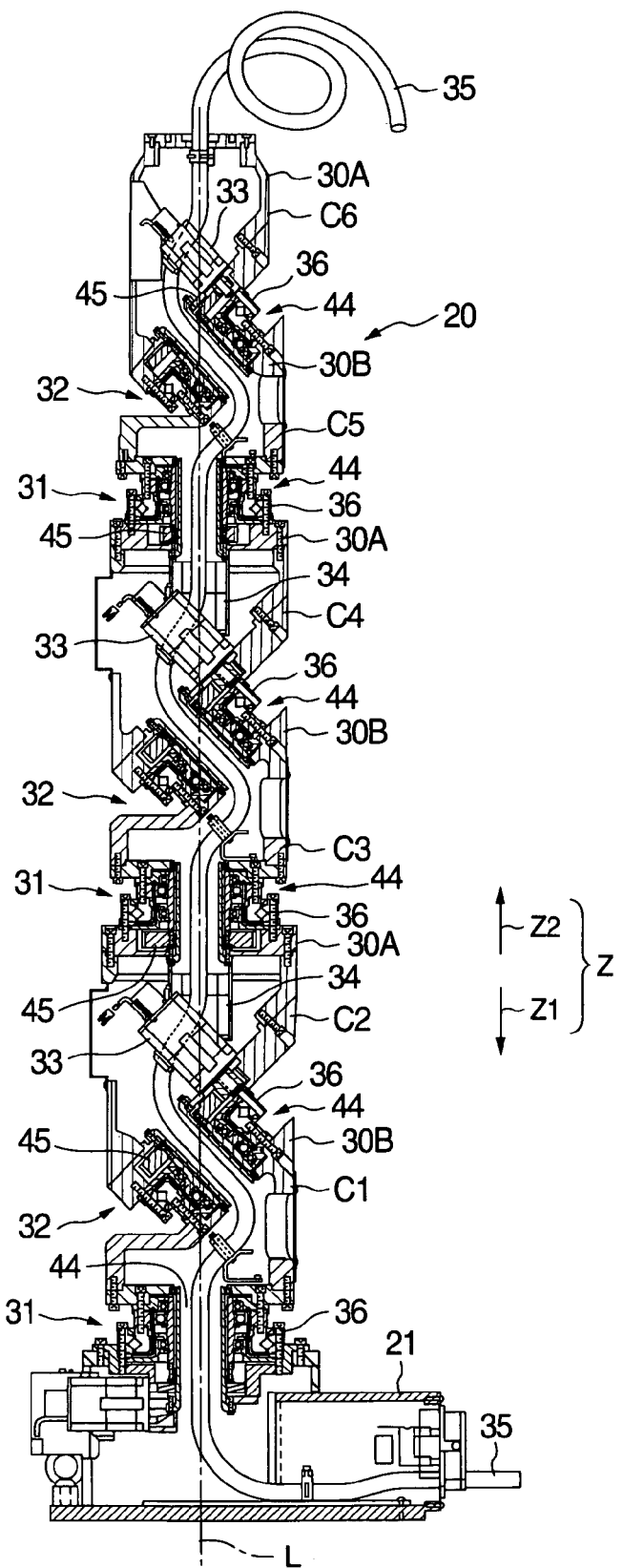
FIG. 3 is a sectional view of the articulated manipulator 20.

FIG. 2 is a typical side elevation of the articulated manipulator 20 and FIG. 3 is a sectional view of the articulated manipulator 20. For example, the articulated manipulator 20 includes six arm members c1 to c6 and a plurality of joints 31 and 32 each rotatably connecting the adjacent arm members.

The first arm member c1 at one of the opposite ends of the articulated manipulator 20 is connected to a base 21, while a hand unit 22 is connected to the sixth arm member c6 at the other end, namely, a working end, of the articulated manipulator 20. The first arm member c1 to the sixth arm member c6 can be extended coaxially in a linear arrangement. The articulated manipulator 20 has the three coaxial joints 31 and the three angular joints 32. In this embodiment, the coaxial joints 31 and the angular joints 32 are arranged alternately in the direction of arrangement of the arm members c1 to c6. The articulated manipulator 20 is able to place the sixth arm member c6 at a desired position in a desired position by turning the adjacent arm members relative to each other.

A desired one of various hand units, namely, end effector, is connected to the working end of the articulated manipulator 20. The articulated manipulator 20 places the hand unit at a desired position. For example, the articulated manipulator 20 carries the hand unit into and places the same at a desired position in an automobile. For example, the articulated manipulator 20 places the hand unit in a space between the floor and the ceiling. The hand unit 22 placed at the desired position performs a handling operation, a sealing operation, a coating operation, a spot welding operation or an arc welding operation.

Referring to FIG. 1, each arm member 30 has a side wall 41 surrounding the axis L, and end walls 42 formed at the opposite ends of the side wall 41 with respect to an axial direction Z so as to close the side wall 41. The side wall 41 and the end walls 42 of the arm member 30 define an internal space 40.

The two adjacent arm members 30 are connected rotatably by a bearing 36. The bearing 36 has an inner ring and an outer ring combined so as to turn relative to each other. The inner and the outer ring of the bearing 36 are fastened to the two adjacent arm members 30, respectively. Practically, the bearing 36 is, for example, an annular cross roller bearing. The cross roller bearing is capable of rotatably supporting the two arm members under radial and axial loads.

In the coaxial joint 31, the axes of the two arm members 30 connected by the coaxial joint 31 and the axis of rotation of the bearing 36 are aligned. The end walls 42 of the two arm members 30 connected by the coaxial joint 31 have coaxial joining surfaces 37, respectively. The joining surfaces 37 are perpendicular to the axes L of the arm members 30.

The respective axes of the two arm members 30 connected by the angular joint 32 are inclined to the axis of rotation of the bearing 36. The two arm members 30 connected by the angular joint 32 have end walls 42 respectively having inclined connecting surfaces 38 and fixed to the bearing 36. The inclined connecting surfaces 38 are inclined to the axes L of the arm members 30 and are parallel to each other. In this embodiment, the inclined connecting surfaces 38 are inclined at an inclination of 45° to the axes of the arm members 30.

The two arm members 30 connected by the bearing 36 turn about the axis of the bearing 36. Thus the axis of rotation of the bearing 36 is aligned with the respective axes R1 and R2 of turning of the arm members 30. The end walls 42 are provided with through holes 39 having axes aligned with the axes R1 and R2 of turning of the arm members 30. The respective internal spaces 40 of the arm members 30 are connected by the through holes 39.

The articulated manipulator 20 is provided with linear members 35 including electric wiring lines and tubes. The linear members 35 extend from the base 21 along the arm members 30 toward the working end of the articulated manipulator 20. The linear members 35 extend through the through hole 39 of the end wall 42, on the side of an axial direction Z1, of the arm member 30, the internal space 40 of the arm member 30 and the through hole 30 of the end wall 42, on the side of an axial direction Z2, of the arm member 30; that is, the linear members 35 extend in an axial direction Z in the internal space 40 of the arm member 30. The linear members 35 are flexible and able to deform together with the articulated manipulator 20 when the arm members are turned.

The articulated manipulator 20 is provided with a driving system including driving motors 33 and 34 for turning the arm members 30 relative to each other. The arm members 30 are classified into first arm members 30A each internally provided with the two driving motors 33 and 34, and second arm members 30B not provided with any devices corresponding to the driving motors 33 and 34. The terms "first arm member 30A" and "second arm member 30B" signify the arm member 30 provided with the driving motors 33 and 34 and the arm member 30 not provided with any devices corresponding to the driving motors 33 and 34, respectively. It is to be noted that the designation of the arm members 30 by the terms "first arm member 30A" and "second arm member 30B" be discriminated from the designation of the two arm members, among the six arm members c1 to c6, by "first arm member c1" and "second arm member c2.

One end of the first arm member 30A is connected to the second arm member 30B. In this embodiment, the first arm members 30A and the second arm members 30B are arranged alternately.

The driving motors 33 and 34 are built into the first arm member 30A. The driving motor 33 drives the first arm member 30A and the second arm member 30B connected to one of the opposite ends, in the axial direction Z1, of the first arm member 30A for turning relative to each other. The other driving motor 34 drives the first arm member 30A and the second arm member 30B connected to the other end, in the axial direction Z2, of the first arm member 30A for turning relative to each other. The driving motors 33 and 34 are disposed in common areas 135 at least partially overlapping each other with respect to the axial directions Z1 and Z2 in the internal space 40 of the first arm member 30A. The driving motors 33 and 34 are arranged in a direction perpendicular to the axial directions.

The articulated manipulator 20 is provided with a reduction gear 44 driven by the rotative driving power of the driving motor 33 (34) and lowering output speed, and a transmission mechanism 45 including a gear train having a plurality of spur gears and capable of transmitting the rotative driving power of the driving motor 33 (34) to the reduction gear 44. The reduction gear 44 has a high reduction ratio, namely, the ratio of input speed to output speed. In this embodiment, the reduction gear 44 having a high reduction ratio is a harmonic gear mechanism generally called Harmonic Drive®. The reduction gear 44 having a high reduction ratio may be any suitable reduction gear other than the Harmonic Drive, such as a planetary gear mechanism or a reduction gear including gears having a special tooth profile.

Figure 4:
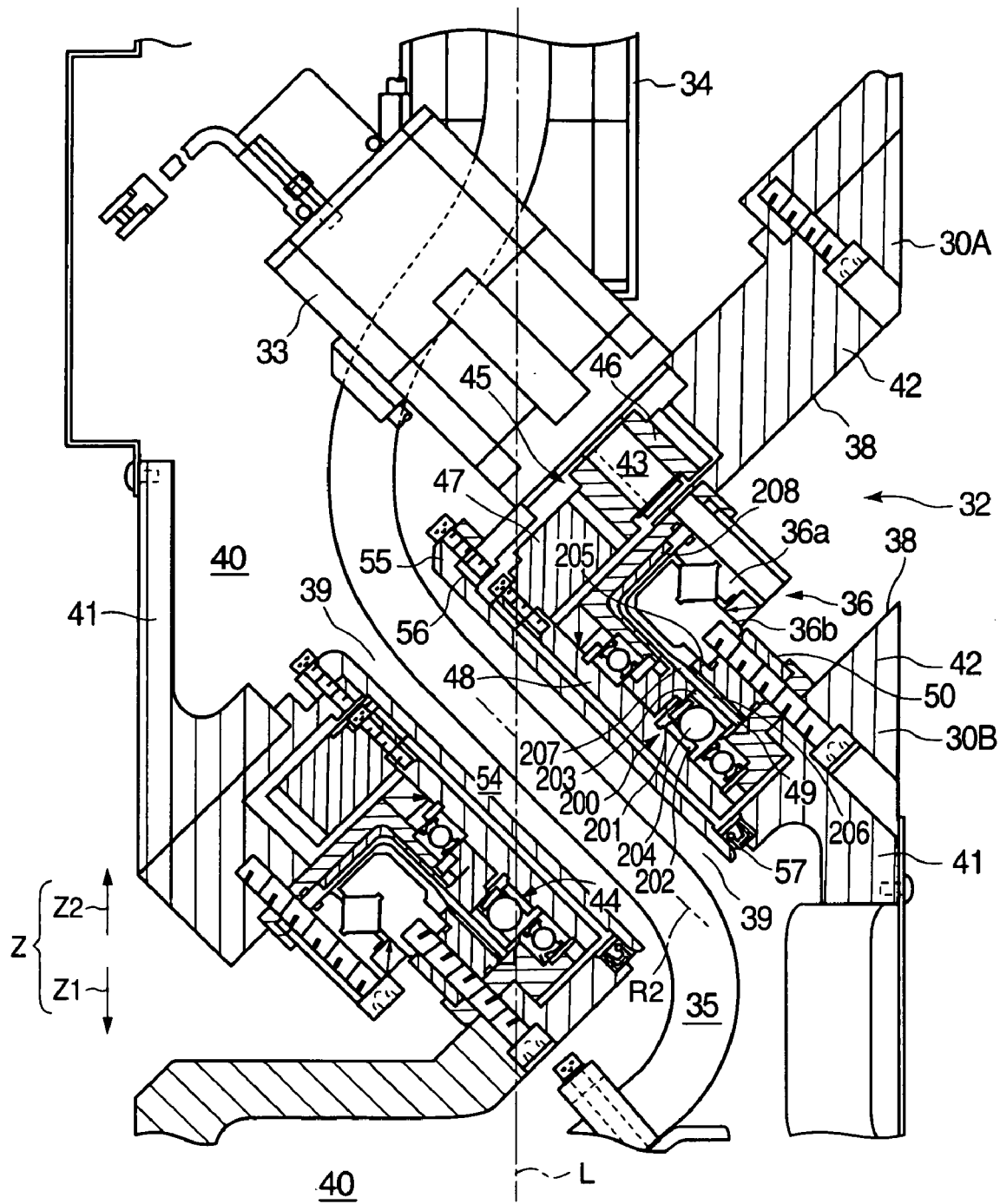
FIG. 4 is an enlarged sectional view of an angular joint and the associated parts included in the articulated manipulator 20.

FIG. 4 is an enlarged sectional view of the angular joint of the articulated manipulator 20. The reduction gear 44 has an input shaft 48, an output shaft 49 and a fixed shaft 50. The input shaft 48 and the output shaft 49 rotate about a predetermined axis of rotation. In the reduction gear 44, the rotating speed of the output shaft 49, namely, the output rotating speed, rotating relative to the fixed shaft 50 is proportional to the rotating speed of the input shaft 48, namely, the input rotating speed. The output rotating speed is far lower than the input shaft. The output shaft 49 rotates relative to the fixed shaft 50. The reduction gear 44 employed in this embodiment is an annular harmonic reduction gear. The respective axes of turning of the input shaft 48 and the output shaft 49 are aligned with the axis R1 of turning of the bearing 36.

The driving motor 33 and the output shaft 49 of the reduction gear 44 are detachably fastened to the end wall 42, facing the angular joint 32, of the first arm member 30A with bolts. The fixed shaft 50 of the reduction gear 44 is detachably fastened to the end wall 42, facing the angular joint 32, of the second arm member 30B.

The driving motor 33 has a rotating output shaft 43. A driving pinion 46, namely, a spur gear, is fixedly mounted on the output shaft 43 and is engaged with a driven gear 47, namely, a spur gear. The driven gear 47 is supported for turning and is detachably fastened to the input shaft 48 of the reduction gear 44 with bolts. The input shaft 48 of the reduction gear 44 is a tubular member supported on the inner side surface of the reduction gear 44. The driven gear 47 has a central opening and is formed in the shape of a ring. The driven gear 47 is fixed to the input shaft 48 of the reduction gear 44. A space inside the reduction gear 44 and a space outside the reduction gear 44 communicate with each other by means of the central opening of the driven gear 47. The driven gear 47 and the input shaft 48 of the reduction gear 44 are coaxial with the bearing 36 and are able to rotate about the axis of the bearing 36.

The axis of the driving pinion 46 is parallel to the axis of rotation of the bearing 36 aligned with the axis R2 of rotation of the two arm members 30A and 30B. The driving motor 33 is disposed such that the axis of the output shaft 43 thereof is parallel to the axis R2 of rotation of the arm members 30A and 30B in a state where the driving pinion 46 and the driven gear 47 are engaged.

The output shaft 49 and the fixed shaft 50 of the reduction gear 44 are fixed to the first arm member 30A and the second arm member 30B, respectively. When rotative force is applied to the input shaft 48 of the reduction gear 44, the output shaft 49 rotates relative to the fixed shaft 50 at a lowered rotating speed and, consequently, the first arm member 30A and the second arm member 30B turn relative to each other. The number of teeth of the driving pinion 46 is smaller than that of the driven gear 47. Thus a gear train consisting of the driving pinion 46 and the driven gear 47 further increases the reduction ratio.

Figure 5:
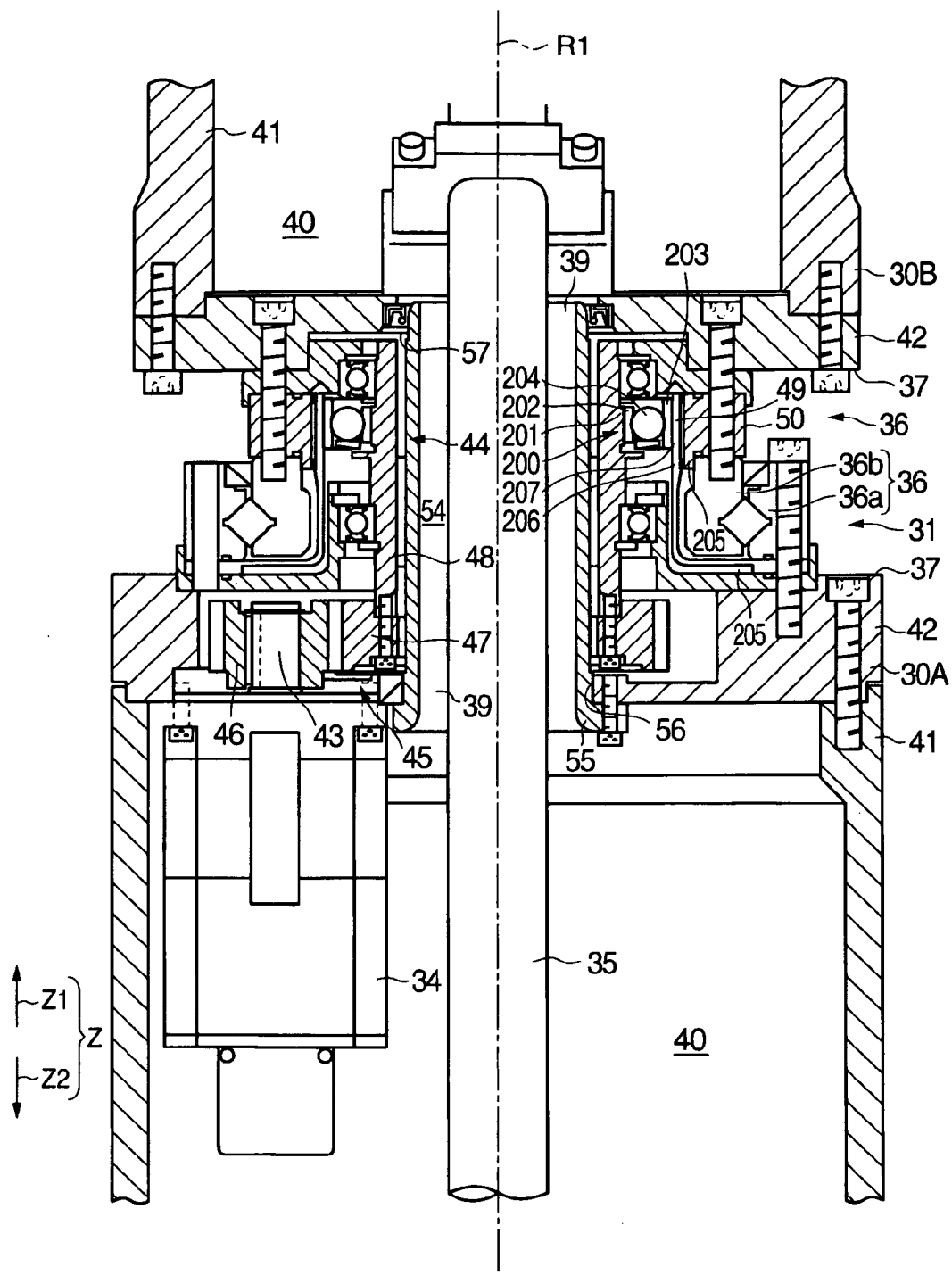
FIG. 5 is an enlarged sectional view of a coaxial joint and the associated parts of the articulated manipulator 20, in which parts shown in FIG. 1 have been turned through 90°.

FIG. 5 is an enlarged sectional view of the coaxial joint 31 and the associated parts of the articulated manipulator 20. The sectional view of the coaxial joint shown in FIG. 1 is turned through an angle of 90° in FIG. 5 to show a transmission mechanism. The coaxial joint 31, similarly to the angular joint 32, is provided with a reduction gear 44 and a transmission mechanism 45. More specifically, the driving motor 34 and the output shaft 49 of the reduction gear 44 are detachably fixed to the end wall 42, facing the coaxial joint 31, of the first arm member 30A with bolts. A fixed shaft 50 included in the reduction gear 44 is detachably fixed to the end wall 42, facing the coaxial joint 31, of the second arm member 30B with bolts.

A driving pinion 46, namely, a spur gear, is fixedly mounted on the output shaft 43 of the driving motor 34 and is engaged with a driven gear 47, namely, a spur gear. The driven gear 47 is supported for turning and is detachably fixed to the input shaft 48 of the reduction gear 44 with bolts. The respective axes of the driven gear 47 and the input shaft 48 of the reduction gear 44 are aligned with the axis of rotation of the bearing 36. The driven gear 47 and the input shaft 48 of the reduction gear 44 turns about the axis of rotation of the bearing 36.

The axis of the driving pinion 46 is parallel to the axis of rotation of the bearing 36 aligned with the axis R1 of rotation of the two arm members 30A and 30B. The driving motor 34 is disposed such that the axis of the output shaft 43 thereof is parallel to the axis R1 of rotation of the arm members 30A and 30B in a state where the driving pinion 46 and the driven gear 47 are engaged. The number of teeth of the driving pinion 46 is smaller than that of the driven gear 47. Thus a gear train consisting of the driving pinion 46 and the driven gear 47 further increases the reduction ratio.

A hollow space 54 in the annular reduction gear 44 connects an opening 39 formed in the end wall 42 of the arm member 30A and an opening 39 formed in the end wall of the arm member 30B. Linear members 35 extend through the opening 39 of the end wall 42, the hollow space 54 of the reduction gear 44 and the opening 39 of the other end wall 42. Thus the linear members 35 extend through the plurality of arm members.

The articulated manipulator 20 is provided with a tubular protective member 55 for protecting the linear members 35. The tubular protective member 55 is extended through the opening 39 of the end wall 42 of the arm member 30A, the hollow space 54 of the reduction gear 44 and the opening 39 of the end wall 42 of the other arm member 30B. The tubular protective member 55 is extended with its axis aligned with the respective axes R1 and R2 of rotation of the two adjacent arm members 30A and 30B between the two adjacent arm members 30A and 30B.

The tubular protective member 55 has one end fixed to the end wall 42 of one of the two adjacent arm members 30 and is extended to the end wall 42 of the other arm member 30. The tubular protective member 55 turns together with the arm member 30 to which one end thereof is fixed. In this embodiment, the tubular protective member 55 is fixed to the end wall 42 of the first arm member 30A. A gap between the outer surface 57 of the tubular protective member 55 and the side surface 56 of the opening 39 of the end wall 42 of the first arm member 30A is sealed with a sealing member, such as an O ring. A gap between the outer surface of the tubular protective member 55 and the side surface 56 of the opening 39 of the end wall 42 of the second arm member 30B is sealed with a sealing member, such as an oil seal. Thus the gap between the outer surface 57 of the tubular protective member 55 and the side surface of the opening 39 of the end wall 42 of the second arm member 30B is sealed so that the tubular protective member 55 and the end wall 42 of the second arm 30B may be able to turn relative to each other.

The internal space of the tubular protective member 55 is hermetically separated from an area in which the reduction gear 44 and the transmission mechanism 45 are disposed. The reduction gear 44 and the transmission mechanism 45 are lubricated with a lubricant, such as grease or oil for the smooth transmission of driving force and the smooth reduction of output speed. Since the gap between the outer surface 57 of the tubular protective member 55 and the side surface 56 of the opening 39 of the end wall 42 of the first arm member 30A is sealed with a sealing member, the lubricant lubricating the reduction gear 44 and the transmission mechanism 45 is prevented from leaking into the tubular protective member 35 and the internal space 40 of the arm member 30.

Since the linear members 55 are extended through the tubular protective member 55, the linear members 35 do not come into contact with the reduction gear 44 and the transmission mechanism 45. Since the linear members 35 do not come into contact with the reduction gear 44 and the transmission mechanism 45 when the reduction gear 44 and the transmission mechanism 45 operate to turn the arm members 30A and 30B relative to each other, the linear members 35 are prevented from being damaged. Preferably, a surface, facing the linear members 35, of the tubular protective member 55 is formed of a material that exerts only low frictional resistance on the linear members 35.

As apparent from the foregoing description, in the articulated manipulator 20 in the first embodiment according to the present invention, the first arm member 30A and the second arm member 30B have the internal spaces 40, respectively. The tubular protective member 55 is extended through the two adjacent arm members 30A and 30B. Thus the linear members 55 can be extended through the articulated manipulator 20 along a direction in which the arm members are arranged in a linear arrangement.

The linear members 35 are not extended along the outer surface of the articulated manipulator 20. Thus the linear members 35 are prevented from coming into contact with obstacles lying around the articulated manipulator 20. Thus the linear members 35 can be prevented from being damaged even if the articulated manipulator 20 is used in a narrow working space or even if many obstacles lie around the articulated manipulator 20.

The linear members 35 may include, for example, power lines for transmitting power to the driving motors 33 and 34, and signal lines for carrying electric signals for controlling the operation of the driving motors 33 and 34. The linear members 35 may include tubes for carrying power to a hand unit connected to the extremity of the articulated manipulator 20 and tubes for carrying materials to be consumed by the hand unit. For example, when the hand unit is a bonding unit, an adhesive may be carried by the linear member 35 to the bonding unit. When the hand unit is a painting unit, paint may be carried to the painting unit by the linear member 35.

Since the driving motors 33 and 34 are built into the first arm member 30A and are arranged in a direction perpendicular to the axial direction Z, the axial dimension of the first arm member 30A may be small. Since the second arm member 30B is not provided with any devices corresponding to the driving motors 33 and 34, the second arm member 30B can be formed in a small size regardless of the sizes of the driving motors 33 and 34 and the articulated manipulator 20 can be formed in a small size. The articulated manipulator 20 having a small size can hold the working end thereof at a desired position in a desired position even in a narrow working space.

The articulated manipulator 20 is provided with the reduction gears 44 each having a high reduction ratio, and the rotative force of each of the driving motors 33 and 34 is applied to either of the two adjacent arm members through the reduction gear 44. Therefore, torques necessary for turning the arm members can be exerted on the arm members even if power capacities of the driving motors 33 and 34 are small. In other words, the driving motors 33 and 34 may be small and the use of the small driving motors 33 and 34 is effective in further reducing the axial dimension of the first arm member 30A. When the respective rotating operations of the output shafts 43 of the driving motors 33 and 34 are controlled to position the working end of the articulated manipulator 20, positioning accuracy can be improved by transmitting driving forces through the reduction gears 44 having the high reduction ratios.

Since the linear members 35 are extended through the tubular protective member 55 between the two connected arm members. The tubular protective member 55 prevents the linear members from coming into contact with the reduction gear 44 and the transmission mechanism 45. Therefore, even if the reduction gear 44 and the transmission mechanism 45 are displaced through angles to turn the arm members, the linear members 35 can be prevented from coming into contact with the reduction gear 44 and the transmission mechanism 45 turning for angular displacement.

Since the hollow space in the tubular protective member 55 is hermetically separated from the area in which the reduction gear 44 and the transmission mechanism 45 are disposed, leakage of the lubricant lubricating the reduction gear 44 and the transmission mechanism 45 into the hollow space of the tubular protective member 55 and the hollow spaces 40 of the arm members can be prevented. At the same time, damaging the reduction gear 44 and the transmission mechanism 45 due to insufficient lubrication can be prevented. On the contrary, substances flowing through the linear members 35 do not leak into the reduction gear 44 and the transmission mechanism 45. For example, paint and an adhesive do not leak into the reduction gear 44 and the transmission mechanism 45. The tubular protective member 55 makes difficult the transfer of heat generated by the reduction gear 44 and the transmission mechanism 45 to the linear members 35.

Use of spur gears as the driving pinion 46 and the driven gear 47 simplifies the transmission mechanism 45. The gear trains each including the driving pinion 46 and the driven gear 47, as compared with the belt drive, can surely transmit the rotative driving forces of the driving motors 33 and 34 and have a high power transmitting capacity. Thus the reliability of the transmission mechanism 45 can be improved and accurate positioning can be achieved. When the number of teeth of the driven gear 47 is greater than that of the driving pinion 46, the transmission mechanism 45 serves also as a reduction gear for further lowering the output speed of the mechanism driven by the driving motor 33 (34).

Differing from the internal bevel gear transmission, the transmission mechanism 45 using the pinion 46 and the gear 47 enables disposing the driving motor 33 (34) and the reduction gear 44 with the axis of the output shaft 43 of the driving motor 33 (34) and that of the input shaft 48 of the reduction gear 44 extended parallel to each other. Therefore, support members supporting the driving motors 33 and 34 and the reduction gear 44 can be easily machined and assembled.

Although the driving motor 33 and the reduction gear 44 can be disposed with the respective axes of the shafts of the driving motor 33 and the reduction gear 44 extended parallel to each other when a belt drive is employed, additional mechanisms are necessary for extending a belt and adjusting the tension of the belt and, consequently, the construction of the articulated manipulator is complicated and a large arm member is necessary. Since the belt has a small bending capacity, a high reduction ratio cannot be achieved by the belt drive.

The transmission mechanism 45 of this embodiment using the spur gears, as compared with a transmission mechanism employing a belt, is effective in simplifying the construction of the first arm member 30A and in forming the first arm member 30A in a small size.

The position of the driving pinion 46 can be easily changed without disengaging the driving pinion 46 from the driven gear 47. Therefore, a space sufficient for laying the linear members 35 is available in the first arm member 30A and the driving motors 33 and 34 can be easily disposed in the first arm member 30A having a small size.

In this embodiment, the axis R2 of rotation about which the two arm members connected by the angular joint 32 turn is inclined at 45° to the respective axes of the arm members. Such an arrangement of the component parts reduces the types of the component parts of the articulated manipulator 20.

Figure 6:
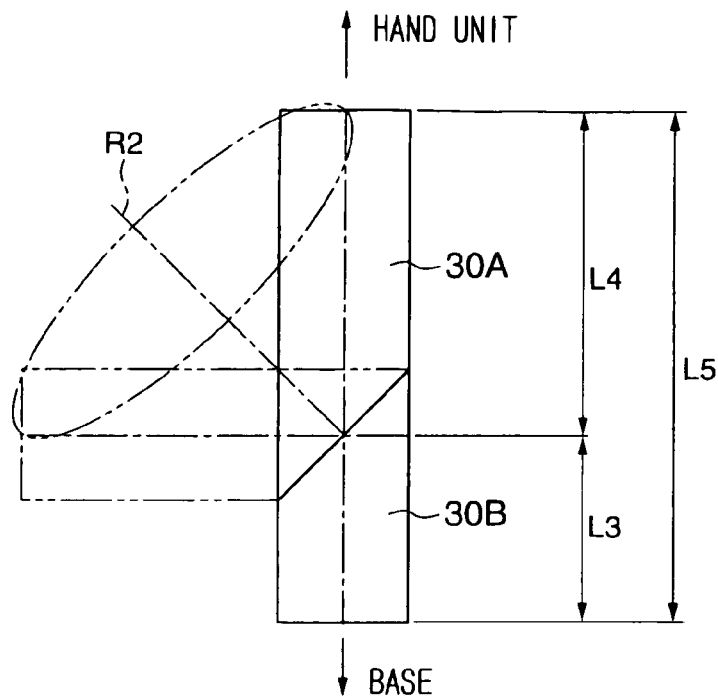
FIG. 6 is a typical view of assistance in explaining the relative motions of a first arm member 30A and a second arm member 30B included in the articulated manipulator 20.
Figure 7:
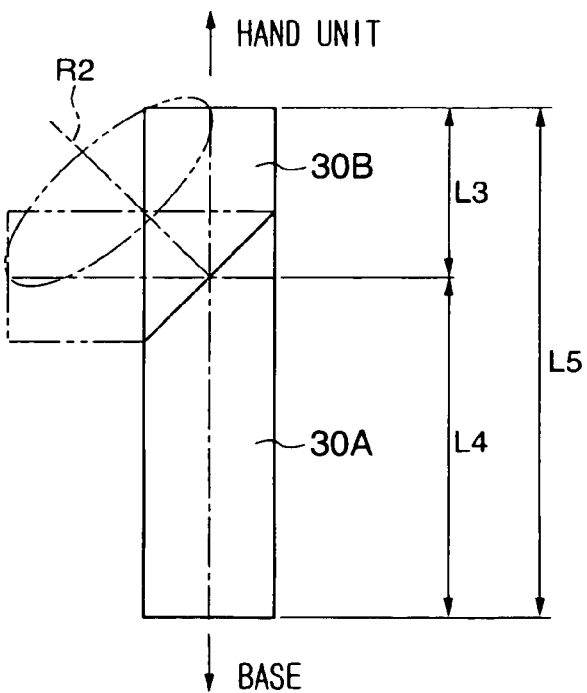
FIG. 7 is a typical view of assistance in explaining the relative motions of a first arm member 30A and a second arm member 30B included in an articulated manipulator in a comparative example.

FIG. 6 is a typical view of assistance in explaining the relative motions of the first arm member 30A and the second arm member 30B included in the articulated manipulator 20, and FIG. 7 is a typical view of assistance in explaining the relative motions of a first arm member 30A and a second arm member 30B included in an articulated manipulator in a comparative example. When the length L5 of a structure formed by connecting the first arm member 30A of an axial length L4 and the second arm member 30B of an axial length L3 is decreased to the least possible extent, the axial length L4 of the first arm member 30A is longer than the axial length L3 of the second arm member 30B Preferably, the arm members 30A and 30B are connected by the angular joint 32 such that the first arm member 30A is on the side of the working end and the second arm member 30B is on the side of the base 21 with respect to the angular joint 32. When the driving arm member is on the side of the base 21 and the driven arm member is on the side of the working end, the driving motors 33 and 34 are fixedly held in the driven arm member. The driving motor 33 disposed in the first arm member 30A drives the first arm member 30A for turning relative to the second arm member 30B disposed at a predetermined position. In this embodiment, the first arm 30A precesses along a conical surface having a generator of a length equal to the axial length L4 of the first arm member 30A about the axis R2 of rotation of the angular joint 32 as shown in FIG. 6. Since the axial length L4 of the first arm member 30A is longer than the axial length L3 of the second arm member 30B, the radius of a circle along which the free end of the first arm member 30A turns is greater than that of a circle along which the free end of a second arm member 30V having an axial length L3 shorter than the axial length L4 of a first arm member 30A included in a comparative example turns. Thus the moving range of the articulated manipulator of the present invention is wider than that of the articulated manipulator in a comparative example. Consequently, even if the articulated manipulator of the present invention having the least shortest length, as compared with the articulated manipulator in the comparative example, can operate in a wide moving range. When the length L5 of the structure formed by connecting the arm members 30A and 30B is fixed, the moving range can be increased by making the first arm member 30A having the axial length L4 longer than the axial length L3 of the second arm member 30B.

In most cases, the articulated manipulator 20 in this embodiment extends upward from the base 21, the second arm member 30B is on the side of the base 21 and the first arm member 30A in on the side of the working end. In most cases, the first arm member 30A extends upward from the angular joint 32. Therefore, the driving motor 33 is above the angular joint 32 and hence the lubricant lubricating the reduction gear 44 and such of the angular joint 32 will not leak into the driving motor 33.

When the reduction gear 44 is a Harmonic Drive, a lubricating area for the Harmonic Drive which needs lubrication is in the second arm member 30B. Since the second arm member 30B is at a level below the angular joint 32, the lubricant can flow easily into the lubricating area for the Harmonic Drive, so that the insufficient lubrication of the Harmonic Drive can be prevented.

The Harmonic Drive will be described. Referring to FIGS. 4 and 5, the input shaft 48 is a generally elliptic part formed by putting a thin ball bearing 200 on an elliptic cam. The bearing 200 has an inner ring 202 is fastened to the driven gear 47 through a cam 201, and an outer ring 203 capable of elastically deformed by balls 204. The fixed shaft 50 is a rigid, annular part. The fixed shaft 50 is provided with an internal gear 205 on its inside surface. The internal gear 205 can be engaged with an external gear 206 formed on the outer surface of the output shaft 49. The number of teeth of the internal gear 205 is greater than that of the external gear 205 by two. The output shaft 49 is formed of a metal and has an elastic, flexible, cylindrical part 207 and a fixed part 208 extending from one end of the cylindrical part 207. The cylindrical part 207 is provided with an external gear 206 engaged with the internal gear 205 of the fixed shaft 50. The fixed part 208 is fixed to the first arm member 30A.

The cylindrical part 207 is put on the outer ring 203 of the bearing 200 and is capable of being bent in an elliptic shape. The external gear 206 of the cylindrical part 207 is engaged with the internal gear 205 of the fixed shaft 50 in a long part of the elliptically bent outer surface. The external gear 206 of the cylindrical part 207 is not engaged with the internal gear 205 of the fixed shaft 50 in a short part of the elliptically bent outer surface. When the input shaft 48 is turned, the input shaft 48 and the cylindrical part 207 are deformed elastically, and the position of engagement of the internal gear 205 and the external gear 206 changes. Since the number of teeth of the external gear 206 is smaller than that of the internal gear 205 of the fixed shaft 50 by two, the output shaft 49 is turned through an angle corresponding to two teeth in a direction opposite the direction in which the input shaft 48 is turned when the input shaft 48 makes one full turn. The turn of the output shaft 49 in the opposite direction is used. Thus the Harmonic Drive is a reduction gear having a high reduction ratio.

In the Harmonic Drive, the internal gear 205 and the external gear 206, and the outer ring 203 of the bearing and the cylindrical part 207 are in high-speed rolling contact and hence those parts must be sufficiently lubricated. Thus an area in which the internal gear 205 and the external gear 206 are engaged, and the outer ring 203 of the bearing and the cylindrical part 207 are engaged is a lubrication area.

Thus, the lubrication area in the Harmonic Drive is near the fixed shaft 50 on the side of the second arm member 30B. As mentioned above, since the second arm member 30B is at a lower level, the lubrication area is at a lower level and hence the lubricant can easily flow into the lubrication area to prevent the insufficient lubrication of the Harmonic Drive.

Figure 8:
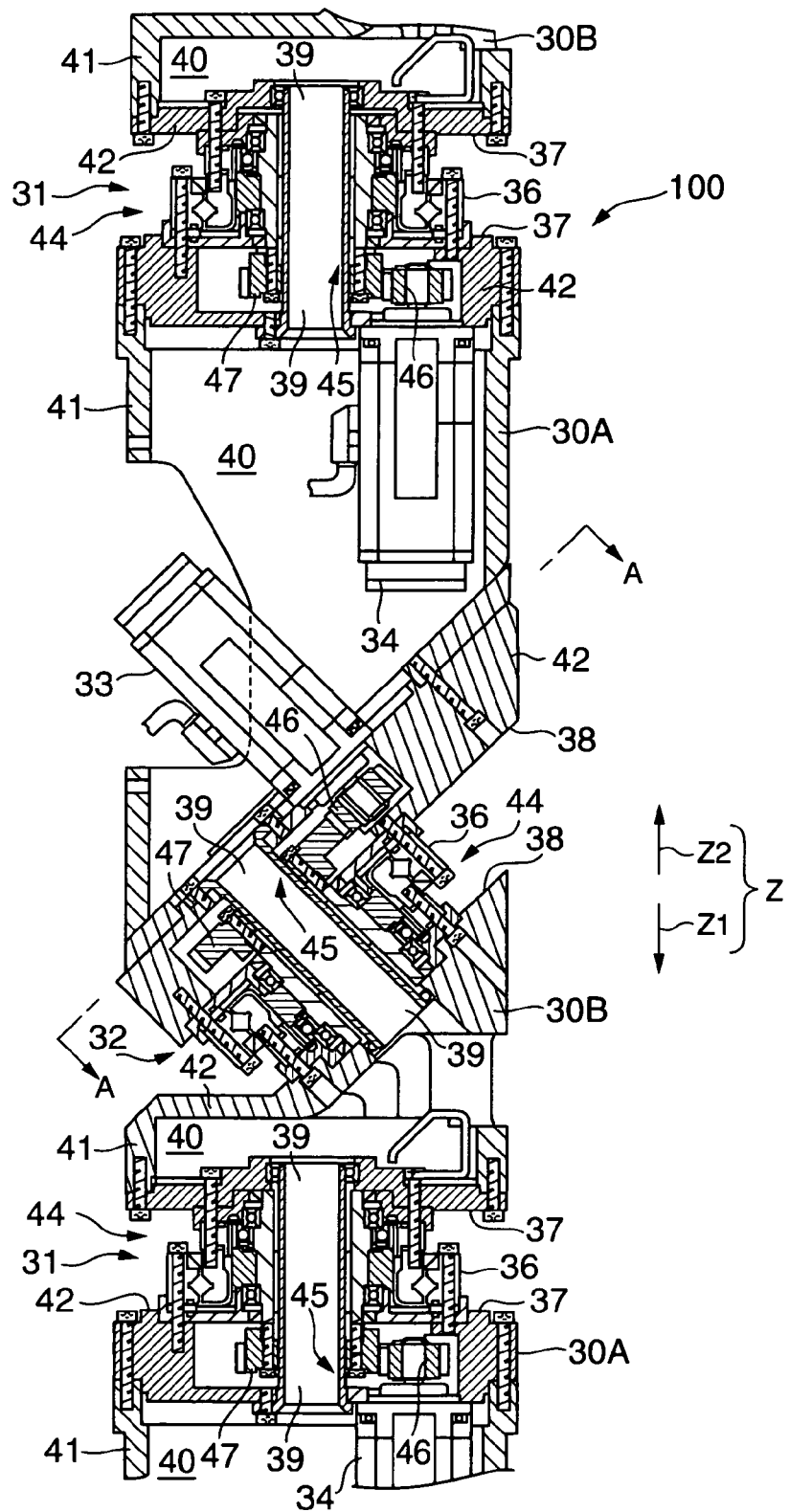
FIG. 8 is a fragmentary sectional view of an articulated manipulator 100 in a second embodiment according to the present invention.
Figure 9:
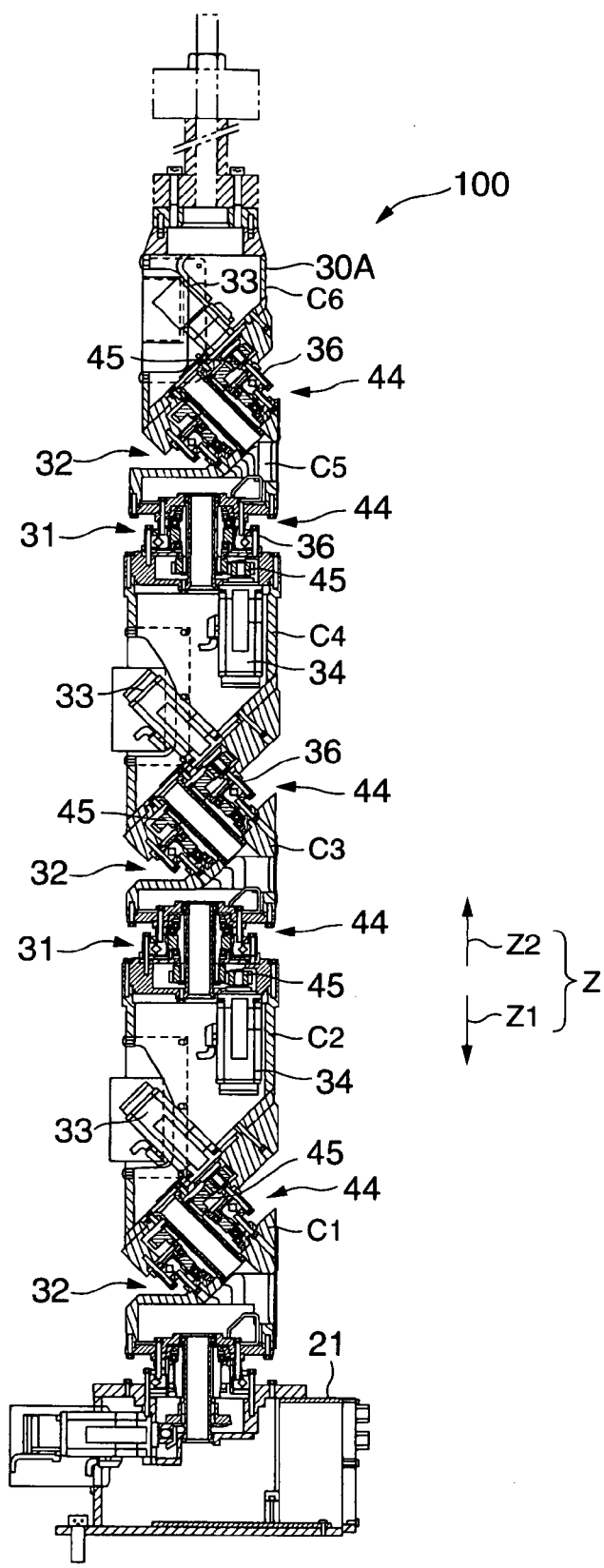
FIG. 9 is a sectional view of the articulated manipulator 100.
Figure 10:
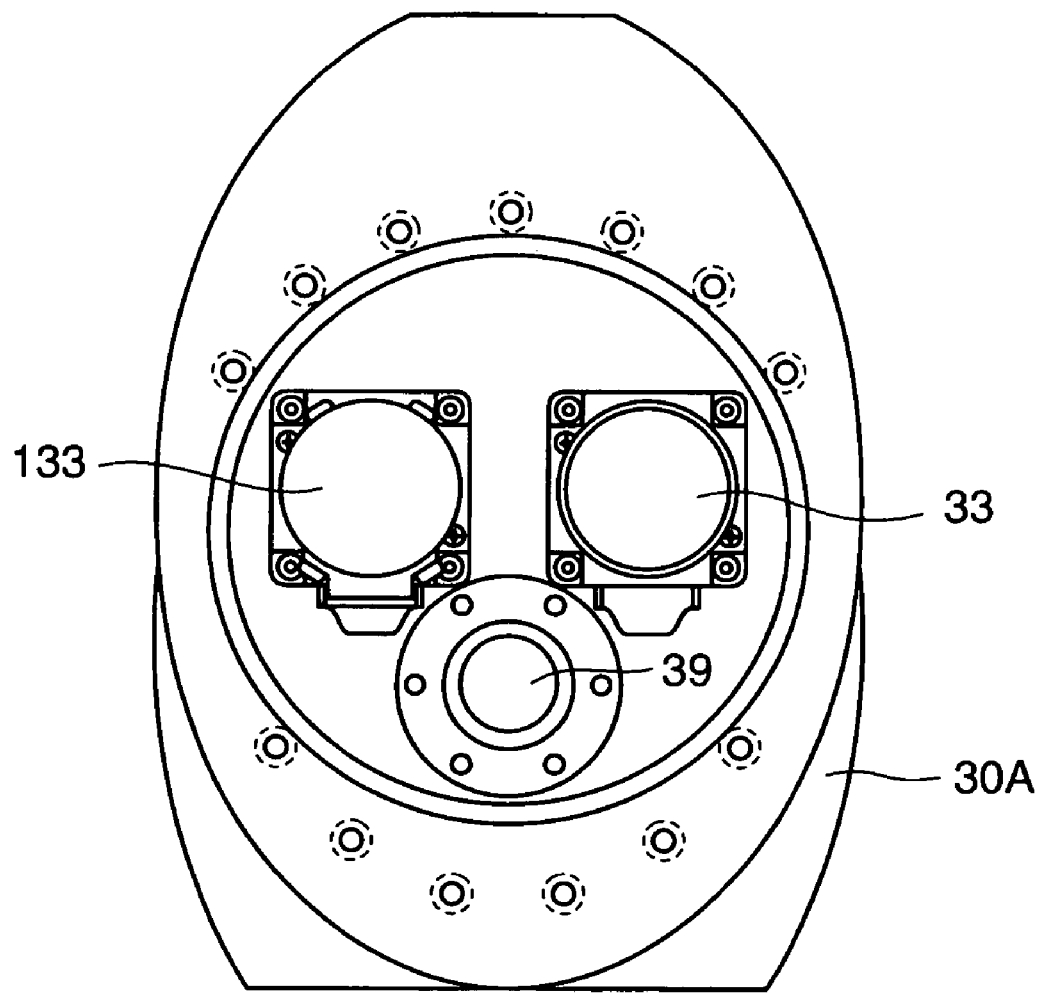
FIG. 10 is a sectional view of the articulated manipulator 100 taken on the line A-A in FIG. 8.
Figure 11:
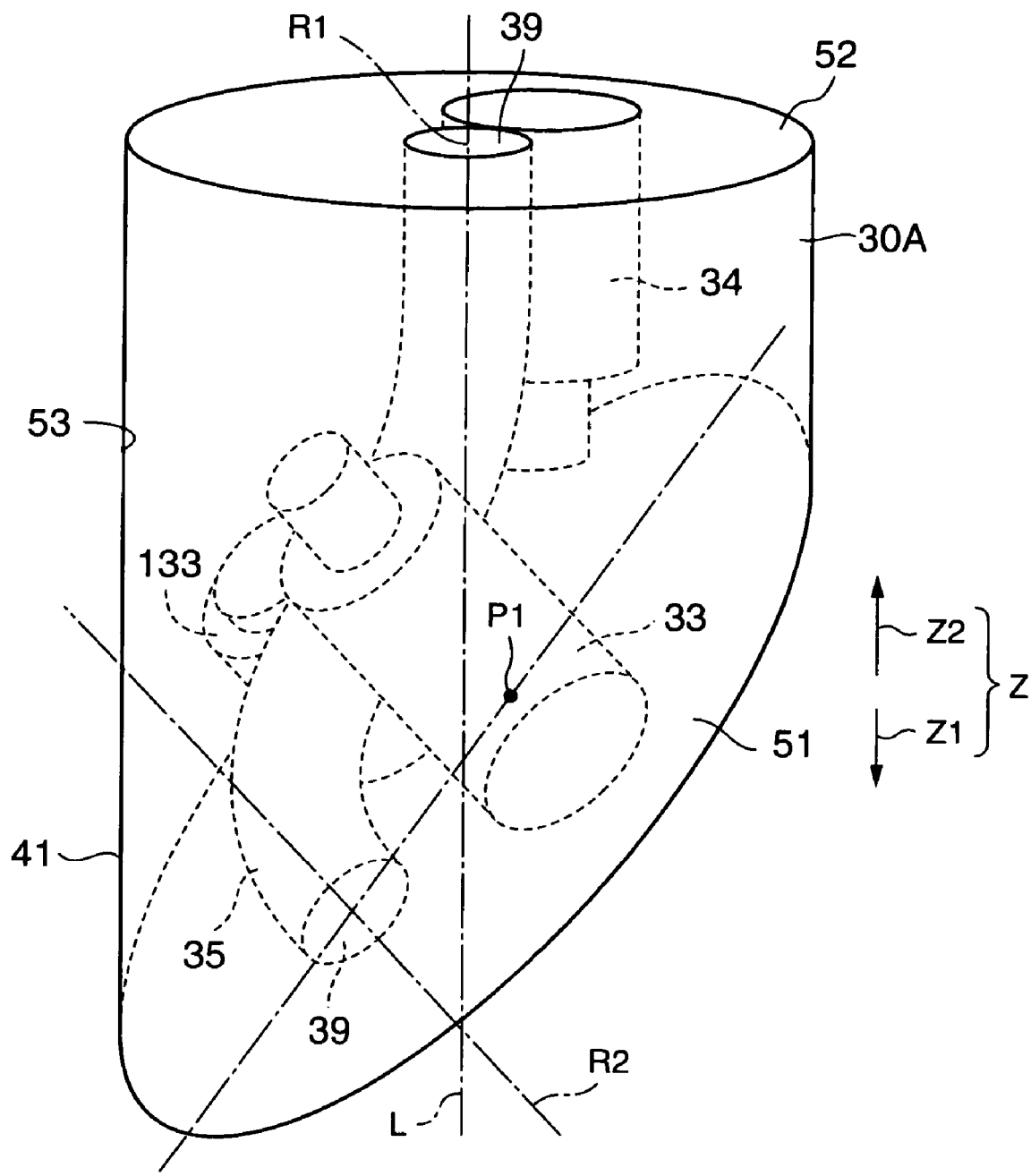
FIG. 11 is a perspective view of assistance in explaining two driving motors 33 and 34 and a brake 133 built into a first arm member 30A.

FIG. 8 is a fragmentary sectional view of an articulated manipulator 100 in a second embodiment according to the present invention, FIG. 10 is a sectional view of the articulated manipulator 100 taken on the line A-A in FIG. 8 and FIG. 11 is a perspective view of assistance in explaining two driving motors 33 and 34 and a brake 133 built into a first arm member 30A. The articulated manipulator 100 is separately provided with the driving motor 33, namely, a driving device, and a brake 133, namely, a brake. A driving pinion is fixedly mounted on the output shaft of the driving motor 33. The driving pinion is engaged with a driven gear 47 to drive the driven gear 47 for rotation by the driving motor 33. A braking gear is fixedly mounted on a rotating shaft included in the brake 133. The braking gear is engaged with a driven gear 47 to brake the driven gear 47. Thus, the driving pinion 46 is engaged with the driven gear 47 to drive the driven gear 47, and the braking gear is engaged with the driven gear 47 to brake the driven gear 47. The driving motor 33 and the brake 133 are disposed in areas at least partially overlapping each other with respect to a direction Z parallel to the axis of a first arm member 30A. The articulated manipulator 100 is the same in other respect as the articulated manipulator 20 shown in FIG. 1. Parts of the articulated manipulator 100 like or corresponding to those of the articulated manipulator 20 are denoted by the same reference characters and the description thereof will be omitted.

Usually, the driving motor 33 and the brake 133 are combined in a coaxial arrangement. Therefore, the assembly of the driving motor 33 and the brake 133 has an axial dimension greater than that of the driving motor 33. When the driving motor 33 and the brake 133 are combined in a coaxial arrangement, an arm member 30A needs to form a space for containing the brake 133 in addition to a space for containing the driving motor 33; that is the axial size and the outside diameter of the first arm member 30A need to be increased by dimensions corresponding to those of the brake 133.

According to the present invention, the driving motor 33 and the brake 133 are disposed separately and are arranged side by side with respect to a direction parallel to the axis of the first arm member 30A. Therefore, the first arm member 30A can be formed in a short axial length and a small outside diameter even if the brake 133 is built into the first arm member 30A. The driving motor 33 and the brake 133 are disposed such that a space for extending linear members 35 is available in the first arm member 30A and the first arm member 30A can be formed in a short axial length and a small outside diameter.

The first arm member 30A contains a first driving system separately provided with the driving motor 33 for a first axial direction Z1 and the brake 133 in a first part and a second driving system provided with a driving motor 34 for a second axial direction Z2 and a brake in combination in a second part.

When the driving motor 33 for the first axial direction Z1 is fixedly held near an optimum position P1, the driving motor 33 can be contained in the first arm member 30A so that the driving motor 33 may not touch the respective inside surfaces 52 and 53 of an end wall 42 and a side wall 41 and the first arm member 30A can be formed in a small size even if the axial length of the driving motor 33 for the first axial direction Z1 is long. In other words, the first arm member 30A with the built-in driving motor 33 for the first axial direction Z1 can be formed in a short axial length.

The driving motor 34 for the second axial direction Z2 may be disposed at an optional position, provided that a space for the linear members 35 is available in the first arm member 30A and the driving motor 34 does not touch the first driving motor 33 for the first axial direction Z1, the brake 133, the end wall 42 and the side wall 41.

As apparent from the foregoing description, the articulated manipulator 100 in the second embodiment according to the present invention is the same in effect as the articulated manipulator 20 shown in FIG. 1. The separate arrangement of the driving motor 33 and the brake 133 is effective in forming the first arm member 30A in a small axial size.

An articulated manipulator 300 in a third embodiment according to the present invention will be described with reference to FIGS. 12, 13 and 14. The articulated manipulator 300 has arm members 30 including those each having one end inclined to its axis and the other end perpendicular to the axis, those each having opposite ends inclined in the same direction to its axis, and those each having opposite ends inclined in opposite directions to its axis. The articulated manipulator 300 has coaxial joints 31 and angular joints 32 connecting those arm members 30. The respective numbers and arrangement of the coaxial joints 31 and the angular joints 32 are different from those of the articulated manipulator 20 shown in FIG. 1. The articulated manipulator 300 is substantially similar in other respects to the articulated manipulator 20 shown in FIG. 1. Parts of the articulated manipulator 300 like or corresponding to those of the articulated manipulator 20 are denoted by the same reference characters and the description thereof will be omitted.

Figure 12:
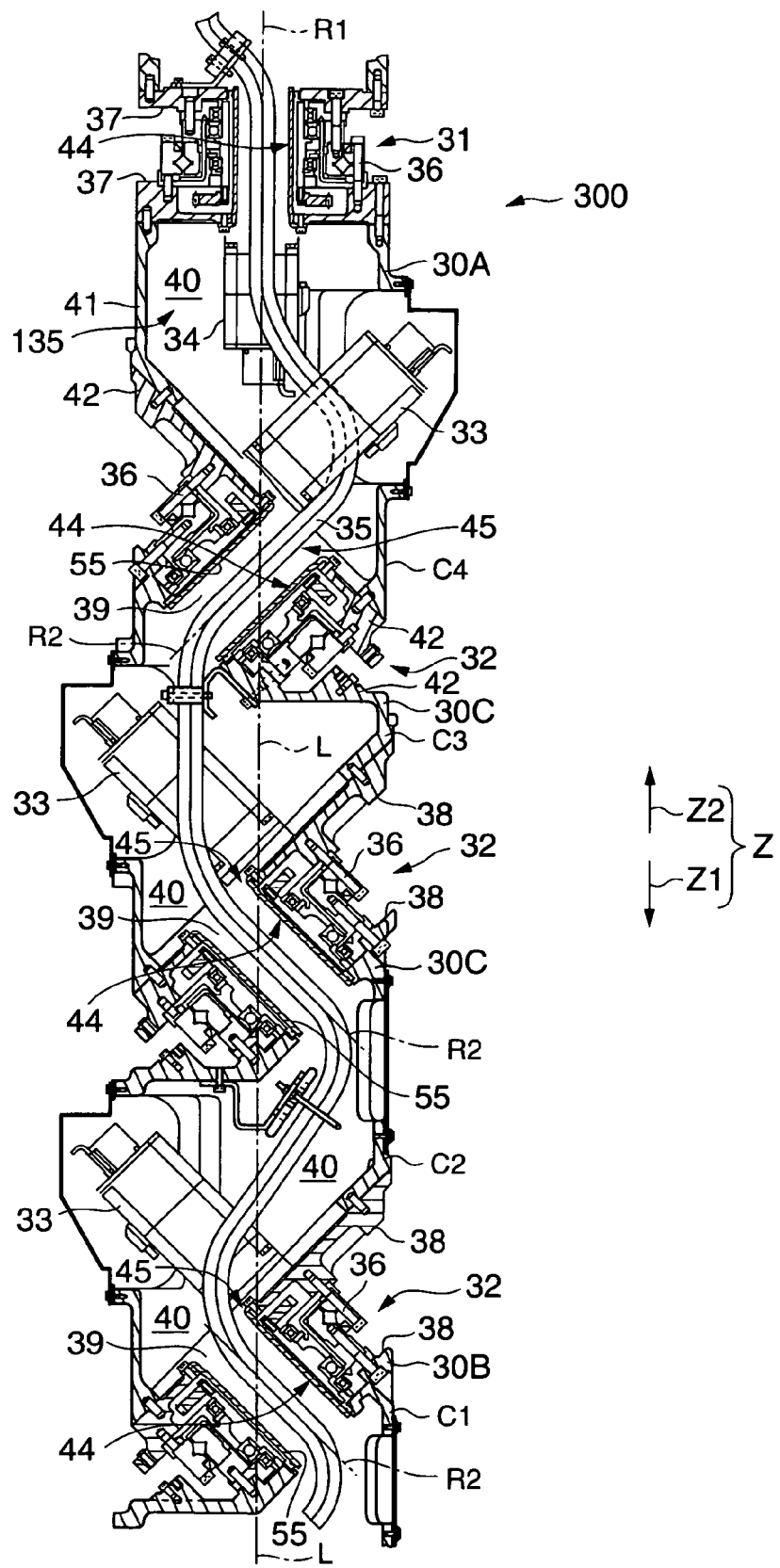
FIG. 12 is a fragmentary sectional view of an articulated manipulator 300 in a third embodiment according to the present invention.
Figure 13:
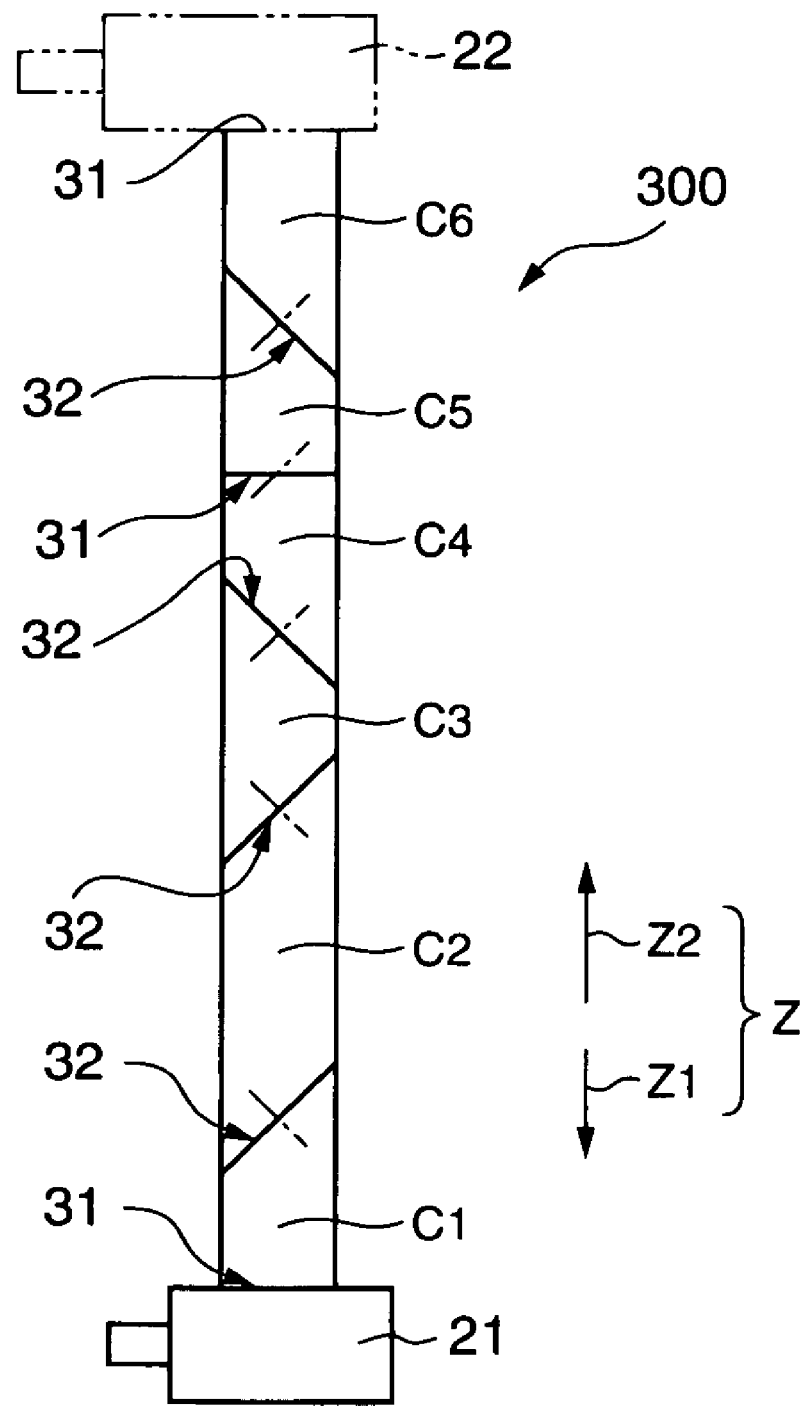
FIG. 13 is a typical side elevation of the articulated manipulator 300.
Figure 14:
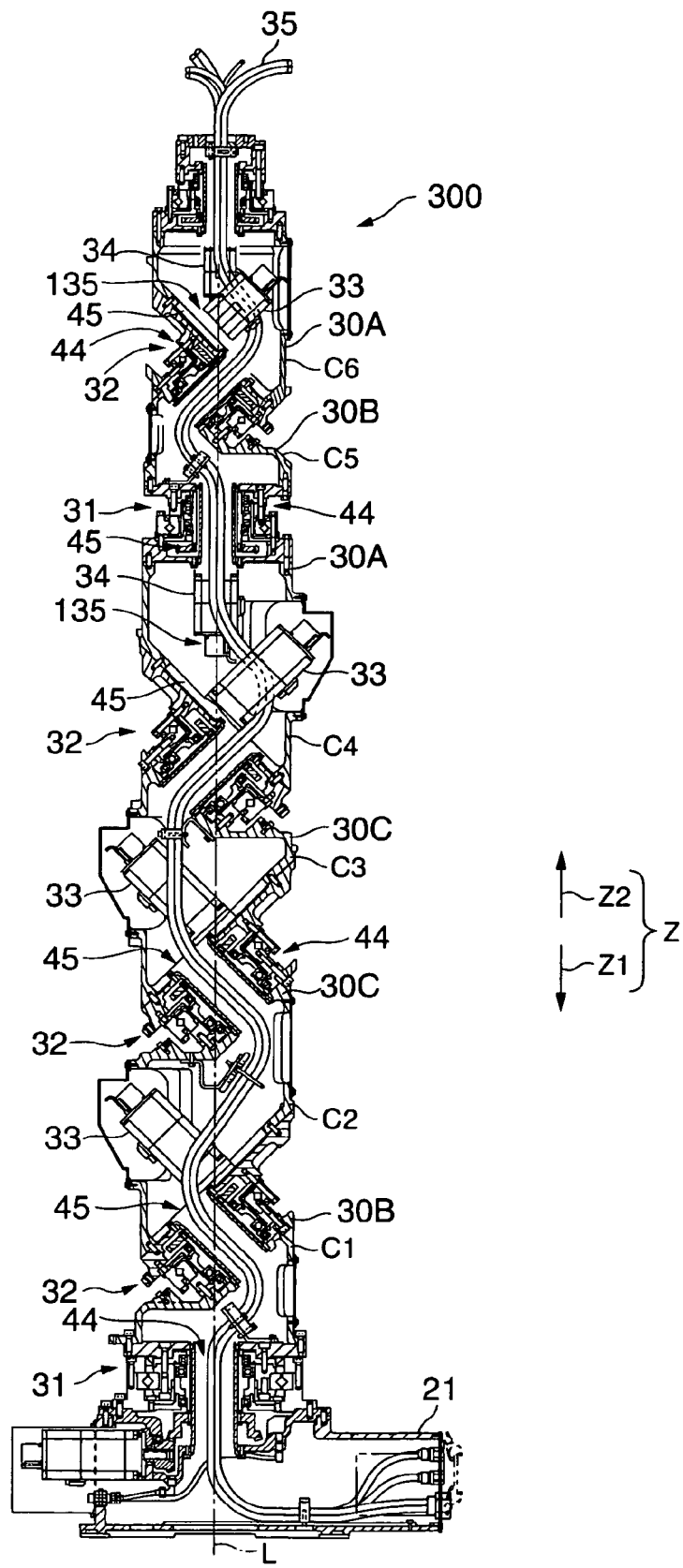
FIG. 14 is a sectional view of the articulated manipulator 300.

FIG. 12 is a fragmentary sectional view of the articulated manipulator 300, FIG. 13 is a typical side elevation of the articulated manipulator 300, and FIG. 14 is a sectional view of the articulated manipulator 300. The articulated manipulator 20 has six arm members c1 to c6 successively connected in a linear arrangement and the joints 31 and 32 each connecting the adjacent ones of the arm members 30 for turning relative to each other. The first arm member c1 at one end of the linear articulated manipulator 300 is connected to a base 21, and a hand unit 22 is connected to the sixth at the other end of the linear articulated manipulator 300. The first arm member c1 to the sixth arm member c6 can be extended coaxially. The joints are the two coaxial joints 31 and the four angular joints 32.

As obvious from comparative observation of FIGS. 2 and 13, the first arm member c1 of the articulated manipulator 300 is the same in shape as the first arm member c1 of the articulated manipulator 20 shown in FIG. 1. As shown in FIG. 13, the second arm member c2 of the articulated manipulator 300 is different in shape from the second arm member c2 of the articulated manipulator 20 and has upper and lower ends inclined to the right, as viewed in FIG. 13, at an angle of 45° to its axis. The third arm member c3 of the articulated manipulator 300 is different in shape from the third arm member of the articulated manipulator 20 and has a lower end an upper end inclined to the right and to the left, respectively, as viewed in FIG. 13, at an angle of 45° to its axis. The fourth arm member c4 of the articulated manipulator 300 is the same in shape as the fourth arm member c4 of the articulated manipulator 20, except that the lower end of the former fourth arm member c4 is inclined to the left instead of to the right, as viewed in FIG. 13, at an angle of 45° to its axis. The fifth arm member c5 of the articulated manipulator 300 is the same in shape as the fifth arm member c5 of the articulated manipulator 20, except that the upper end of the former fifth arm member c5 is inclined to the left instead of to the right, as viewed in FIG. 13, at an angle of 45° to its axis. The sixth arm member c6 of the articulated manipulator 300 is the same in shape as the sixth arm member c6 of the articulated manipulator 20, except that the lower end of the former sixth arm member c6 is inclined to the left instead of to the right, as viewed in FIG. 13, at an angle of 45° to its axis.

Thus the connection of the arm members 30 in the articulated manipulator 300 is different from that of the arm members 30 in the articulated manipulator 20. In the lower and the upper end of the arm member c2 are connected to the adjacent arm members by the angular joints 32 having axes inclined to the same direction, respectively, and the lower and the upper end of the arm member c3 are connected to the adjacent arm members by the angular joints 32 respectively having axes inclined in perpendicular directions, respectively.

The articulated manipulator 300, similarly to the articulated manipulator 20, is provided with driving means each for driving the two adjacent arm members 30 for turning relative to each other. The driving means include driving motors 33 and 34. The arm members 30 of the articulated manipulator 300 are divided into first arm members 30a each provided with the driving motors 33 and 34, and second arm members 30B not provided with any devices corresponding to the driving motors 33 and 34, and third arm members 30C each provided with the driving motor 33. In the articulated manipulator 300, the arm members c1, c2, c, c4, c5 and c6 are the second arm member 30B, the third arm member 30C, the third arm member 30C, the first arm member 30A, the second arm member 30B and the first arm member 30A, respectively.

The driving motors 33 and 34 of the articulated manipulator 300, similarly to those of the articulated manipulator 20, are disposed in common areas 135 at least partially overlapping each other with respect to the axial directions Z1 and Z2 in the internal space 40 of the first arm member 30A. The driving motors 33 and 34 are arranged in a direction perpendicular to the axial directions.

In the articulated manipulator 300, the arm members c4 and c6 are the first arm members 30A, each first arm member 30A is provided with the two driving motors 33 and 34, and the driving motors 33 and 34 are arranged in a direction perpendicular to a direction Z parallel to the axis of the first arm member 30A. Therefore, the first arm member 30A can be formed in a small axial size. The driving motors 33 and 34 do not need to be built into the second arm member 30B, namely, the arm member c5 extending between the arm members c4 and c6. Therefore, the second arm member 30B can be formed in a small size regardless of the sizes of the driving motors 33 and 34. Since the first arm member 30A and the second arm member 30B can be thus formed in small sizes, the articulated manipulator 300 can be miniaturized. Thus the working end of the miniaturized articulated manipulator 300 can be held at a desired position in a desired position even in a narrow operating space. While the second arm members 30B of a small size are connected to the opposite ends of the first arm member 30A, respectively, in the articulated manipulator 20, the second arm member 30B and the third arm member 30C are connected to the opposite ends of the first arm member 30A, respectively, in the articulated manipulator 300. Thus the second arm member 30B can be miniaturized.

In the articulated manipulator 300, the upper and the lower end of the arm member c2 are inclined parallel to each other, the upper and the lower end of the arm member c3 are inclined perpendicularly to each other, and the upper end of the arm member c2 and the lower end of the arm member c3 are connected by the angular joint 32. Therefore, a hand unit 22 attached to the working end of the articulated manipulator 300 can be moved to a low position near the base 21 by, for example, setting the arm member c3 in a horizontal position and setting the arm member c3 in a vertical position. Thus the hand unit 22 can be moved in a wide operating range relative to the base 21.

Naturally, the articulated manipulator 300 has the foregoing effects and effects similar to those of the articulated manipulator 20 shown in FIG. 1.

The embodiments of the present invention described herein are only examples and changes may be made therein without departing from the scope of the present invention. For example, the joints of the articulated manipulator 20 may be arranged in an arrangement other than that in which the joints are arranged in the articulated manipulator 20. The respective numbers of the joints and the arm members are not limited to those mentioned above. The angle of inclination of the angular joints is not limited to 45°. The linear members 35 are not limited to electric wiring lines and tubes.

According to the present invention, at least one of the two arm members connected to the opposite ends of the other arm member can be miniaturized and hence the articulated manipulator can be miniaturized. The arm members of the miniaturized articulated manipulator can be turned in a narrow space, such as a narrow space between the ceiling and the floor, without touching the ceiling and the floor. Consequently, the object connected to the articulated manipulator can be easily and surely moved.

According to the present invention, the driver and the brake are not arranged coaxially and hence the arm member can be formed in a small size as compared with the arm member in which the driver and the brake are arranged coaxially. Consequently, the articulated manipulator can be formed in a short overall length. The arm members of the miniaturized articulated manipulator can be turned in a narrow space, such as a narrow space between the ceiling and the floor, without touching the ceiling and the floor. Consequently, the object connected to the articulated manipulator can be easily and surely moved.

According to the present invention, the rotative driving force is transmitted through the reduction gear to the arm member to turn the arm member relative to the other. Therefore, even a small driving means is able to exert a torque necessary for turning the arm member on the arm member. The arm member with the small driving means can be miniaturized, which enables further miniaturization of the articulated manipulator.

Since the driving force of the driving means is transmitted through the gear train including the spur gears to the reduction gear, the construction of the arm member with the built-in driving means can be simplified and the same arm member can be miniaturized. The component parts of the articulated manipulator can be easily designed, machined and assembled. When the driven gear interlocked with the reduction gear is disposed at a predetermined position, the drive pinion interlocked with the driving means and engaged with the driven gear can be disposed at an optional position. Thus the position of the driving means in the arm member can be selectively determined and hence a space for holding the driving means and a space for the linear members can be secured in the arm member even if the arm member is miniaturized.

According to the present invention, the linear members are extended through the arm members and are not needed to be extended along the outer surfaces of the arm members. Consequently, the linear members can be prevented from touching obstacles lying outside the arm members. Since the linear members are passed through the tubular protective members, the linear members can be prevented from touching the reduction gear and the transmission mechanism. Since the linear members are prevented from touching the external obstacles, the reduction gear and the transmission mechanism, the linear members will not be damaged and the articulated manipulator is able to work smoothly.

The present invention prevents the leakage of the liquid from the reduction gear and the transmission mechanism into the spaces where the linear members are extended. For example, even if the reduction gear and the transmission mechanism are lubricated with a lubricant, such as grease or oil, the lubricant is prevented from leaking into the spaces where the linear members are extended. Therefore, the reduction gear and the transmission mechanisms can be prevented from being damaged due to insufficient lubrication and the linear members will not be made dirty.

Even if the overall length of the articulated manipulator is fixed, the moving range of the articulated manipulator can be expanded by using the arm members not provided with any driving means as driving arm members. Thus the articulated manipulator is able to move in a necessary moving range without increasing the overall length thereof. The articulated manipulator of the present invention is able to operate in a moving range wider than that in which articulated manipulators which are the same in overall length as the articulated manipulator of the present invention.

Even if the overall length of the articulated manipulator is fixed, the moving range of the articulated manipulator can be expanded by using the arm members not provided with any driving means as driving arm members. Thus the articulated manipulator is able to move in a necessary moving range without increasing the overall length thereof. The articulated manipulator of the present invention is able to operate in a moving range wider than that in which articulated manipulators which are the same in overall length as the articulated manipulator of the present invention.

The invention claimed is:

1. An articulated manipulator comprising;
   a plurality of arm members successively connected in a linear arrangement;
   a plurality of joints each connecting adjacent arm members of the plurality of arm members so that the adjacent arm members are able to turn relative to each other,
      wherein one joint of consecutive joints rotates on an axis of rotation that is inclined with respect to an axis of rotation of the other respective joint of the consecutive joints; and
   a plurality of driving means each for driving two adjacent arm members of the plurality of arm members for turning relative to each other;
   wherein at least one of the arm members of the plurality of arm members has opposite ends connected to two other arm members of the plurality of arm members by respective ones of the plurality of the joints, the at least one arm member having the opposite ends connected to the two other arm members being provided with two driving means of the plurality of driving means for driving respective ones of the two other arm members connected thereto for turning, and the two driving means being integrated into the arm member having the opposite ends connected to the two other arm members and being disposed in areas at least partially overlapping each other with respect to a direction along an axis of the arm member having the opposite ends connected to the two other arm members.

2. The articulated manipulator according to claim 1, further comprising a reduction gear for reducing an input operating speed of the driver integrated into the arm member having opposite ends connected to the two other arm members to a lower output operating speed in transmitting a rotative driving force of the driver to an adjacent arm member, and a transmission mechanism including a gear train having a plurality of spur gears respectively having axes parallel to those of the two arm members connected by the joint and capable of transmitting the rotative driving force of the driver to the reduction gear.

3. The articulated manipulator according to claim 2, wherein at least one of the joints of the plurality of joints is an angular joint connecting the two adjacent arm members such that one of the two adjacent arm members is able to precess about an axis inclined to respective axes of the two adjacent arm members relative to an other arm member of the two adjacent arm members, and the driving means being integrated into the arm member of the two adjacent arm members connected by the angular joint, on the side of the working end of the articulated manipulator.

4. The articulated manipulator according to claim 2, wherein linear members are passed through the arm members, linear members being extended through spaces in which the reduction gear and the transmission mechanism are installed, a tubular linear member protecting member being extended between the two adjacent arm members, and the linear members are extended through the tubular linear member protecting member.

5. The articulated manipulator according to claim 4, wherein at least one of the joints of the plurality of joints is an angular joint connecting the two arm members such that one of the two adjacent arm members is able to precess about an axis inclined to the respective axes of the two adjacent arm members relative to an other arm member of the two adjacent arm members, and the driving means is built into the arm member of the two adjacent arm members connected by the angular joint, on the side of the working end of the articulated manipulator.

6. The articulated manipulator according to claim 4, wherein an internal space of the tubular linear member protecting member is hermetically separated from the spaces in which the reduction gear and the transmission mechanism are installed.

7. The articulated manipulator according to claim 6, wherein at least one of the joints of the plurality of joints is an angular joint connecting the two adjacent arm members such that one of the two arm members is able to precess about an axis inclined to respective axes of the two adjacent arm members relative to an other arm member of the two adjacent arm members, and the driving means is built into the arm member of the two adjacent arm members connected by the angular joint, on the side of the working end of the articulated manipulator.

8. The articulated manipulator according to claim 1, wherein at least one of the joints of the plurality of joints is an angular joint connecting the two adjacent arm members such that one of the two adjacent arm members is able to precess about an axis inclined to respective axes of the two adjacent arm members relative to an other arm member of the two adjacent arm members, and the driving means is integrated into one of the arm members of the two adjacent arm members connected by the angular joint, on the side of the working end of the articulated manipulator.

* * * * *